Feb. 28, 1928.
J. LUEBBERT
VEHICLE RIM
Original Filed March 22, 1926
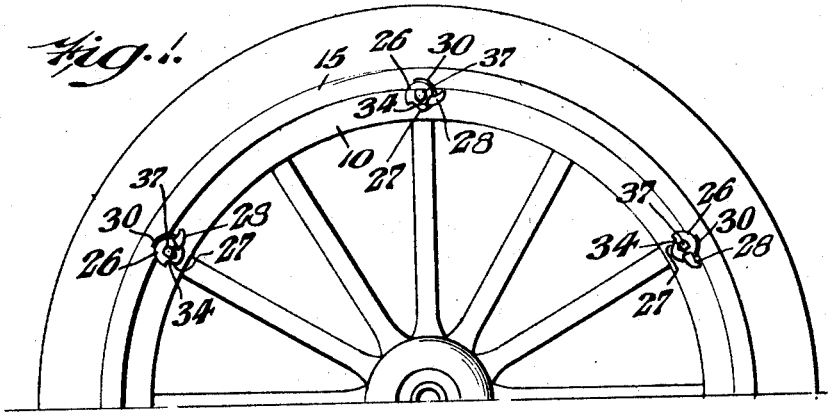
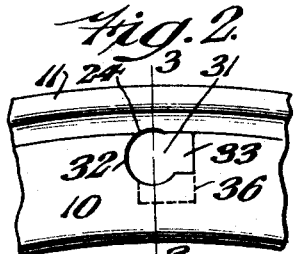
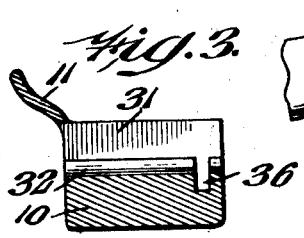
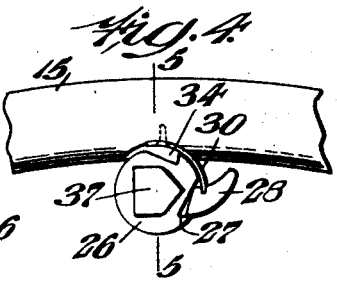
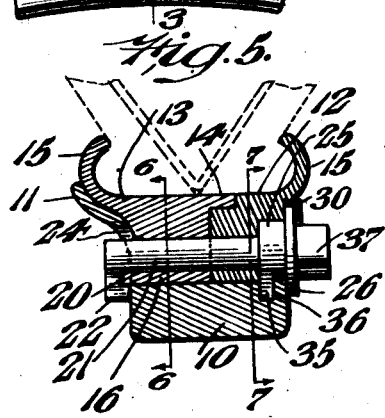
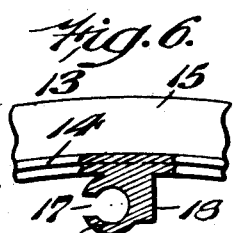
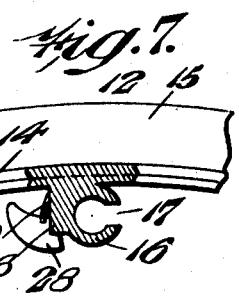
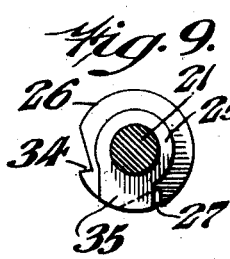
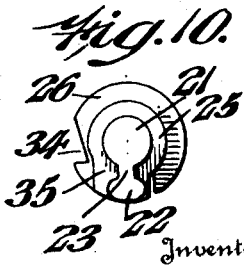
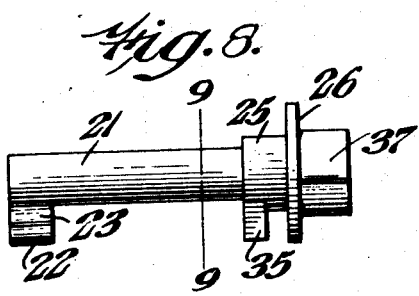
Inventor
Joseph Luebbert,
By Robert M. Barr.
Attorney Patented Feb. 28, 1928.

1,660,998

UNITED STATES PATENT OFFICE.

JOSEPH LUEBBERT, OF MARGATE CITY, NEW JERSEY, ASSIGNOR, BY MESNE ASSIGNMENTS, OF ONE-HALF TO HATTIE M. CURRAN, OF ATLANTIC CITY, NEW JERSEY.

VEHICLE RIM.

Application filed March 22, 1926, Serial No. 96,517. Renewed October 14, 1927.

The present invention relates to vehicle wheels and more particularly to a demountable rim for tires.

Some of the objects of the present invention are to provide an improved means for mounting a tire upon a rim; to provide an improved demountable rim for vehicle wheels; to provide a mechanism for locking a tire to a rim and locking the rim to a vehicle wheel; to provide a device whereby tire rims can be quickly removed from a wheel and the tires removed from such rims equally quickly; to provide a combined tire fastening means and rim lock for vehicle wheels; to provide a tire and rim locking device wherein nuts, bolts and removable lugs are dispensed with; and to provide other improvements as will hereinafter appear.

In the accompanying drawings Fig. 1 represents a side elevation of a portion of a vehicle wheel embodying one form of the present invention; Fig. 2 represents a detail of the wheel felly with the tire rim and locking device removed; Fig. 3 represents a section on line 3—3 of Fig. 2; Fig. 4 represents a portion of the tire rim in side elevation; Fig. 5 represents a section on line 5—5 of Fig. 4; Fig. 6 represents a section on line 6—6 of Fig. 5; Fig. 7 represents a section on line 7—7 of Fig. 5; Fig. 8 represents a detail in side elevation of one form of locking device; Fig. 9 represents a section on line 9—9 of Fig. 8; and Fig. 10 represents an end elevation of the locking device.

Referring to the drawings, one form of the invention is shown as applied to a wheel felly 10 of the demountable tire rim type having a circumferential flange 11 at one side to form an abutment to properly locate the tire rim upon the felly 10. In the present instance, the tire rim is formed of two sections 12 and 13 divided circumferentially and meeting in assembled condition in an overlapping or rabbeted joint 14 which on the tire receiving side lies in a plane to one side of the medial plane of the wheel so that there is no danger of pinching the inner tube of the tire.

For the purpose of rigidly locking the sections 12 and 13 together to clamp the tire shoe in place, each section of the rim is provided with a circumferential concave flange 15 and a plurality of tubular lugs 16 arranged at suitable places about the rim and on the face which is to seat upon the felly 10. Each of the lugs 16 is provided with a through slot 17 and a laterally projecting key block 18, the arrangement of these being alike in each instance so that when the device is assembled the slots of the pairs of lugs 16 will register and the key blocks 18 lie in the same plane. The set of tubular lugs upon the rim section 13 are provided respectively on their outer ends with stops 20 so that the cooperating locking part will be limited in its motion and properly positioned for locking purposes.

This cooperating locking part consists in the present instance of a keeper bar 21 of circular section in order to have a snug sliding fit in the tubular members 16 and carries at one end a radially projecting keeper 22 which has a neck portion 23 to fit freely within the slot 17 of the lug 16 so that the keeper bar can be passed through a pair of lugs 16 until the keeper 22 is beyond the end of the lug 16 when the bar 21 can be turned to bring the keeper 22 over the end of the lug to prevent withdrawal of the keeper bar 21. As here shown, the rim section 13 has a cutway portion 24 to permit free rotation of the keeper in the desired manner. Spaced from the keeper 22 a distance substantially equal to the end to end length of two abutting lugs 16 the keeper bar 21 is provided with a head 25 of increased diameter so that in assembled condition the keeper bar 21 rigidly clamps the two lugs 16 together and thereby rigidly fastens the two tire sections together at the required number of points about their circumference.

In order to lock the keeper bar to hold the two rim sections assembled the head 25 is provided with a flange 26 which is provided with a notch 27 arranged to receive a pawl 28 which in the present instance is mounted upon a relatively stiff spring 30 attached to the adjacent rim section.

When the tire has been fitted upon the two rim sections 12 and 13 the keeper bars 21 are respectively entered in the tubular lugs 16 and when the respective keepers leave the slot 17 the keeper bars 21 are turned to the locking position out of register with the slot and the spring pawls 28 at that time respectively snap into the notches 27, thus locking the sections of the rim together and clamping the tire fast to the rim.

For the purpose of mounting the assembled tire and tire rim upon the wheel felly the latter is provided with a plurality of grooves 31 extending transversely across the rim receiving surface and having a portion 32 circular in contour to conform to the curvature of the lugs 16 and an offset portion 33 conforming to the contour of the keeper block 18. In the assembled condition of the tire rim the keeper bar 21 has its keeper 22 in alinement with the block 18 and consequently the tire rim can be slipped directly over the felly and the keeper bars 21 pass respectively into the grooves 31 in order to bring the keepers 22 to a position projecting from the opposite side of the felly. In this position the keeper bar 21 of each locking device is given a partial turn so that the keepers 22 are out of register with the block slot 33 and consequently the parts are rigidly clamped together because the flange 26 of each of these bars is then abutting the opposite side of the felly 10. This flange 26 is provided with a second notch 34 also arranged to receive the spring pressed locking pawl 28 and in its locking position receives the pawl and holds the keeper rigidly in its locking position.

As an auxiliary means for interlocking the keeper bar 21 and felly, the former is provided with a projecting detent 35 which is arranged to seat in a locking slot 36 of the felly, there being one of these slots for each of the transverse grooves 31 and the slots open respectively into such grooves so that the turning of the keeper bars 21 brings the respective detents into the slots 36. The keeper bars 21 terminate respectively at the end opposite to the keepers 22 in a polygonal shaped extension 37 to receive a wrench or other suitable tool for turning the keepers in the required manner.

From the foregoing it will be apparent that a demountable rim fastening means has been devised wherein nuts and bolts have been dispensed with as well as clamping lugs requiring removal by special wrenches before the tire rim can be taken off. Furthermore the present construction provides a simple, expeditious means for releasing a tire from a rim so that instead of unlocking the meeting ends of a split rim and laboriously prying the tire from its rim, all that is necessary is to release the keeper bars by a partial turn thereof and withdraw them from the rim grooves. When this is done the circumferentially divided rim allows the tire to be taken off without effort.

The simplicity of the construction is evident by the minimum number of parts; by the absence of parts requiring tools to assemble and disassemble the tire, tire rim and felly; and by the provision of a common means for clamping the tire to the rim, and fastening the tire to the felly.

Having thus described my invention, I claim:

1. A wheel rim construction comprising a felly provided with a plurality of transverse slots in the face thereof, a rim having a plurality of tubular lugs arranged respectively to seat in said slots and having a slot lengthwise thereof, keeper bars arranged to rotatably fit within said lugs, keepers on the respective bars to pass through said lug slots and be turned out of register therewith to lock said parts together, and locks for respectively retaining said keepers in locked position.

2. A wheel rim construction comprising a plurality of keeper bars provided with radially projecting keepers, a demountable circumferentially split tire rim having lugs provided with slots to receive and seat the respective keeper bars, a felly having transverse grooves to seat said lugs respectively, said bars in assembled condition projecting said keepers to one side of said felly for turning movement out of register with said grooves and slots, and means to lock each bar in its out of register position whereby said tire, said rim and said felly are interlocked.

3. In a wheel rim construction, a circumferentially divided tire rim, radial lugs on each rim section, said lugs having bores arranged for mutual registry in aligned pairs, a bar insertable through said bores for rotation in said lugs, means on said bar for locking said rim sections together on rotation of said bar, said means being formed for locking engagement with opposite sides of a wheel felly on further rotation of said bar.

4. In a wheel rim construction, the combination with a felly having a transverse peripheral groove opening at each side thereof, of a tire rim circumferentially divided in two sections, guide lugs on each section for seating engagement in said groove and apertured transversely in alignment, a bar insertable through said lug apertures for rotation in said lugs, means on said bar for clamping said rim sections together on rotation of said bar through a predetermined degree, said means being formed for engagement over the opposite sides of said felly at the ends of said groove on further rotation of said bar to lock said rim to the felly.

5. A wheel rim construction comprising a felly, a demountable tire rim, a rotatable keeper, and means formed integral with said keeper for clamping said rim on a tire and locking said rim to the felly successively by rotation of said keeper.

6. A wheel rim construction comprising a felly, a sectional demountable tire rim, a rotatable keeper, means formed integral with said keeper for clamping the rim sections in service position and locking said rim to the felly successively by rotation of the keeper, and means for retaining said keeper in both its rim section clamping and rim locking positions.

Signed at Atlantic City, county of Atlantic, State of New Jersey, this 17th day of March, 1926.

JOSEPH LUEBBERT.